US009577979B1

(12) United States Patent
Lepeska (10) Patent No.: US 9,577,979 B1
(45) Date of Patent: Feb. 21, 2017

(54) LOCAL NAME RESOLUTION (71) Applicant: ViaSat, Inc., Carlsbad, CA (US)

(72) Inventor: Peter Lepeska, Boston, MA (US)

(73) Assignee: ViaSat, Inc., Carlsbad, CA (US)

( * ) Notice: Subject to any disclaimer, the term of this patent is extended or adjusted under 35 U.S.C. 154(b) by 254 days.

(21) Appl. No.: 14/080,712

(22) Filed: Nov. 14, 2013

Related U.S. Application Data (60) Provisional application No. 61/726,202, filed on Nov. 14, 2012.

(51) Int. Cl.
*G06F 15/16* (2006.01)
*H04L 29/12* (2006.01)

(52) U.S. Cl.
CPC .................. *H04L 61/2528* (2013.01)

(58) Field of Classification Search
CPC .................................................... H04L 67/2852
USPC .................. 709/245, 220, 225, 228
See application file for complete search history.

(56) References Cited

U.S. PATENT DOCUMENTS

| | | | | |
|---|---|---|---|---|
| 7,127,524 B1 * | 10/2006 | Renda | ...................... | H04L 29/12 709/223 |
| 7,222,306 B2 * | 5/2007 | Kaasila | .................. | G06F 3/0481 715/760 |
| 7,680,954 B2 * | 3/2010 | Zhang | ................ | H04L 29/12066 709/245 |
| 7,689,671 B2 * | 3/2010 | Bhakta | ............... | H04L 29/12047 709/219 |
| 7,996,475 B2 * | 8/2011 | Drako | ..................... | G06Q 10/00 709/206 |
| 8,527,631 B1 * | 9/2013 | Liang | ...................... | H04L 63/12 709/225 |
| 2002/0112076 A1 * | 8/2002 | Rueda | ..................... | H04L 12/14 709/245 |
| 2004/0136357 A1 * | 7/2004 | Jo | ........................... | H04L 12/24 370/351 |
| 2004/0194106 A1 * | 9/2004 | Ogawa | ............. | H04L 29/12066 718/100 |
| 2005/0066041 A1 * | 3/2005 | Chin | ................... | H04L 12/4641 709/228 |
| 2006/0029035 A1 * | 2/2006 | Chase | ..................... | H04L 45/02 370/351 |
| 2006/0064589 A1 * | 3/2006 | Taniguchi | ......... | H04L 29/12009 713/170 |

(Continued)

*Primary Examiner* — Philip B Tran
(74) *Attorney, Agent, or Firm* — Kilpatrick Townsend & Stockton LLP (57) ABSTRACT

Embodiments described herein relate to systems and methods for local name resolution in network communications. Particular embodiments may enable a device resolution request to include a name that identifies the user device issuing the resolution request. A proxy server may accept the resolution request, and respond with a service internet protocol address that is customized to that user device, such that compatible user devices on the same local area network will each receive a different service IP address. When the proxy server receives traffic on a particular service IP address from a local area network, the proxy server may identify the compatible device even if a network address translation device has adjusted the requesting IP address for the device. Particular implementations may enable acceleration of HTTPS communications by the proxy server, or other such benefits.

20 Claims, 7 Drawing Sheets

(56) References Cited

U.S. PATENT DOCUMENTS

| | | | |
|---|---|---|---|
| 2006/0206606 A1* | 9/2006 | Iloglu | H04L 41/0893 |
| | | | 709/224 |
| 2010/0064047 A1* | 3/2010 | Sullivan | H04L 61/1511 |
| | | | 709/228 |
| 2010/0088398 A1* | 4/2010 | Plamondon | H04L 67/2852 |
| | | | 709/220 |
| 2010/0246602 A1* | 9/2010 | Barreto | H04L 49/90 |
| | | | 370/466 |
| 2010/0250767 A1* | 9/2010 | Barreto | H04L 69/16 |
| | | | 709/231 |
| 2013/0046878 A1* | 2/2013 | Fryc | G06F 11/3672 |
| | | | 709/224 |
| 2013/0286868 A1* | 10/2013 | Oyman | H04W 24/06 |
| | | | 370/252 |
| 2014/0133354 A1* | 5/2014 | Scharf | H04L 45/42 |
| | | | 370/254 |

* cited by examiner

LOCAL NAME RESOLUTION

CROSS-REFERENCES TO RELATED APPLICATIONS

This application claims the benefit of and is a non-provisional of U.S. Provisional Application Ser. No. 61/726,202 filed on Nov. 14, 2012, entitled "DIFFERENTIAL HANDLING OF HTTPS PER DEVICE" which is hereby expressly incorporated by reference in its entirety for all purposes.

BACKGROUND

Many home networks and other local area networks (LANs) include multiple end user devices are positioned behind a network address translation (NAT) device such as a home router. Such NAT devices obscure the identity of devices operating in the LAN and prevent the operation of certain communication techniques with individual devices. For example, if a system is attempting to use web page acceleration techniques in web communications with devices behind a NAT, it is difficult to know which end user devices can be accelerated and which cannot.

The impact of NAT devices is often seen in web browsing, in which a user selects web page content and receives objects, which is a core part of the Internet experience for Internet users. While the experience of users is typically a single selection followed by the viewing of a web page that is presented on the screen, the process of presenting the web page on the screen can involve a large number of objects and multiple request/response round trip communications from the user system to a system that is providing the web page.

One method of improving the performance of web page transmission and presentation is HTTP (Hypertext Transfer Protocol) prefetching. HTTP prefetching typically involves pre-requesting content on behalf of a client or browser before a request for that content is actually generated as a typical HTTP request and response in the course of a typical web page transaction. Certain prefetching embodiments involve pre-requesting content based on predictions about a future user selection without any actual action or selection by the user. Other HTTP prefetching systems involve pre-requesting content in response to a user action or selection as part of a web page transaction. In such systems, when content is prefetched it may become possible to satisfy the request for that content locally (with regard to the client or browser) or at a location with a lower latency to the user, thereby negating the need to transmit the request and wait for the response from a content server. For example, in cases where there exists high latency between the client generating the request and the server which responds with the context requested, each negated request/response may avoid the penalty for such latency, thereby potentially reducing the total time required to satisfy the entire series of requests for the client. This may result in an accelerated end user experience.

BRIEF DESCRIPTION OF THE DRAWINGS

The present disclosure is described in conjunction with the appended figures.

DETAILED DESCRIPTION

The following describes systems and methods for identifying certain individual devices on a network in an environment where the identity of individual devices may be obscured. Certain embodiments, for example, may involve identification of at least one user device by a proxy server, when the user device is one of multiple devices in a local area network that is connected to another network, such as the Internet, using a NAT device, and where the NAT device is located between the user device and the Internet.

Certain networking systems use a transparent proxy acting as a "man in the middle" (MITM) for a variety of different purposes such as network acceleration and caching. Such systems may attempt to improve a user experience of network responsiveness without disruptions caused by the need for regular user selections to enable the improvements. Such improvements, however, may require device level customization. In particular, the MITM may need to receive customized information that lets the MITM know what network traffic is associated with a particular device. As described above, NAT devices may obscure the identity of individual devices, so that a transparent proxy is unable to identify the individual devices, and is therefore unable to provide system benefits to the individual device. Embodiments herein describe systems and methods for enabling a transparent proxy to identify devices behind a particular NAT by creating device specific service IP addresses for each compatible device behind a single NAT. The service IP addresses need to be unique for each device behind a particular NAT device, but need not be globally unique, because each NAT device will provide the proxy server with a different IP address associated with the NAT device. Because particular IP addresses at a proxy will only be used by one compatible device per NAT, and each compatible device will communicate using a different IP address at the proxy, the system may identify each compatible device per NAT based on the destination IP address (or unique service IP address) used by the particular compatible user device.

Figure 1:
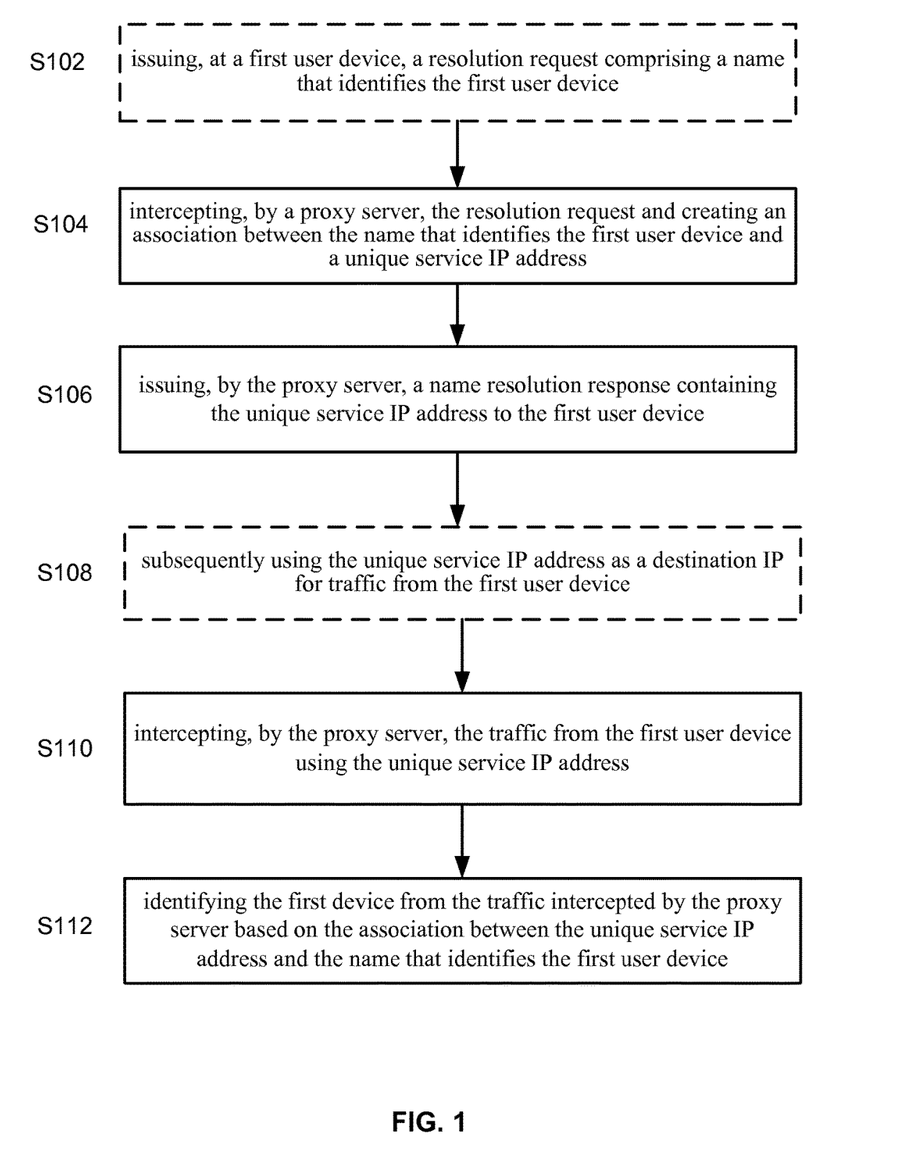
FIG. 1 illustrates a method for differential handling of traffic for devices behind a NAT.

FIG. 1 describes one potential such method for differential handling of devices operating behind a NAT. In S102, a first user device issues a resolution request comprising a name that identifies the first user device. Such a resolution request may be distinguished from other resolutions requests by the presence of the name. This is because the name provides a way of distinguishing different user devices behind a NAT device. In a non-proxied system, each new network transaction may include a resolution request that will involve a request to a domain name server to look up the address of a requested uniform resource locator. This occurs, for example, at the beginning of a request for a web page from www.contentprovider.com. The device will then issue a direct request to a content server. In a system with a NAT, the IP address of the requesting device will be replaced with the NAT devices IP address, and so any device downstream from the NAT will not be able to distinguish the particular device from any other particular device behind the NAT device.

In a system with a proxy, the user device communicates a resolution request to the proxy, and the proxy handles separate resolutions with any number of content servers on behalf of the user device. For example, in such a system, each network communication session may begin with a resolution request for "proxy.networkprovider.com." This resolution only needs to occur once at the beginning of each session. The proxy may then handle opening communication with www.contentprovider.com.

Embodiments described herein, however, will include a device identifier in the initial resolution request to the proxy. For example, continuing with the example above, a request for information from "www.contentprovider.com" may begin with a resolution request form "proxy.networkprovider.com_devicename." The device name may be the network IP address, a device name, or some other identifier that distinguishes the device from other devices behind a particular NAT device. In other embodiments, the device name may be a DNS protocol extensions, and does not necessarily need to be attached to the host name as shown in the example "proxy.networkprovider.com_devicename." Thus, any aspect of the resolution request that enables the proxy server to distinguish between different user devices behind a NAT device may enable the name that identifies a user device. Individual devices may be configured to create resolution requests with a name identifying the user device by using installed software or remote configuration techniques. One particular remote configuration technique may be to use proxy.pac or proxy auto-config (PAC) files with web proxy autodiscovery protocols (WPAD) to automatically configure communication tools such as a web browser operating on a user device. A PAC file defines how web browsers and other user agents, which may function as part of a user device, can automatically choose an appropriate proxy server or other network communication method for initiating traffic to request particular objects or web pages. A PAC file may either be configured manually or determined automatically be the use of Web Proxy Autodiscovery (WPAD) protocol. Other such methods of configuring a device may be apparent to a person of ordinary skill in the art. Additionally, prior to S102, additional steps may be performed to verify that the device is capable of sending such a resolution request or that the device or communications software operating on the device such as a web browser will respond to proxied communications. User security selections, "opt-out", or "opt-ins" selections may also be required in various embodiments. Additional details of examples of such options are described below.

In S104, then, the proxy server intercepts the resolution request and creates an association between the device name and a unique service IP address. This unique service IP address may simply be unique among the user devices behind a particular NAT device. Such an association may be a table, a list, a mapping, or any other such association.

In S106, then, the proxy server issues a name resolution response to the user device containing the unique service IP address. In S108, the user device then uses the unique service IP address as a destination IP for traffic from the user device. For example, requests for additional objects or content from the content provider will be communicated to the content provider via the unique service IP address of the proxy. In S110, the proxy receives the network communications traffic from the first user device that is using the unique service IP address. In S112, based on the previously made association, the proxy may identify that the network communications traffic is associated with the particular user device.

After the proxy identifies that traffic is associated with a particular device, functionality enabled on a per-device basis by the proxy may be used for the network communications traffic. For example, prefetching techniques that require the particular device to be known, or use of cache history information stored at a proxy for the particular device may be used to accelerate network communications, presentation of a web page to a user, or other such benefits.

One particular implementation of such systems and methods for differential handling of devices behind a NAT may operate to enhance systems using HTTPS. HTTPS is an obstacle to improving web performance, especially in systems with high latency, such as satellite systems. Certain embodiments described herein describe differential methods for handling HTTPS in order to enable acceleration of HTTPS communication for devices configured to support such acceleration. While particular examples related to HTTPS are described in detail as one potential use of differential handling of devices behind a NAT, it will be apparent to a person of ordinary skill in the art that such implementations may apply to other embodiments dealing with issues such as malware detection, content distribution, caching, security, and other similar aspects of network communications with devices behind a NAT.

Just as described above, some HTTPS acceleration techniques may involve terminating SSL at a User Terminal (UT) which is functioning as a proxy and acting as a "man in the middle" (MITM) in order to decrypt and optimize HTTPS traffic. The server certificates presented to the web browser client as part of the security of HTTPS may be dynamically generated by and signed with a certificate authority (CA) in the UT and may contain most of the same fields as the original webserver certificate. The subject domain name (DN), serial number, validity dates, and extensions may be preserved. However, the issuer DN may now be set to the name of the UT's certificate issuing authority or CA and the public/private keys of the UT CA may be used in creating a forged certificate. If the browser trusts this CA, due to the UT CA having been installed in the browser's certificate database, then the MITM session, which involves splitting the browser-to-content-server session into two SSL sessions split at the UT, may occur in a way that is transparent to the end user.

Many end-user devices such as televisions, mobile phones, etc. provide no mechanism for accepting such certificates on-the-fly and cannot be accelerated. As a result, if MITM HTTPS acceleration were employed, users would either experience a pop-up every time they visited an HTTPS site from one of these devices or would be blocked from accessing the site if the HTTPS transaction was part of an embedded application. Since multiple end user devices are typically positioned behind a network address translation (NAT) device such as a home router, it is difficult to know which end user devices can be accelerated and which cannot.

Figure 2A:
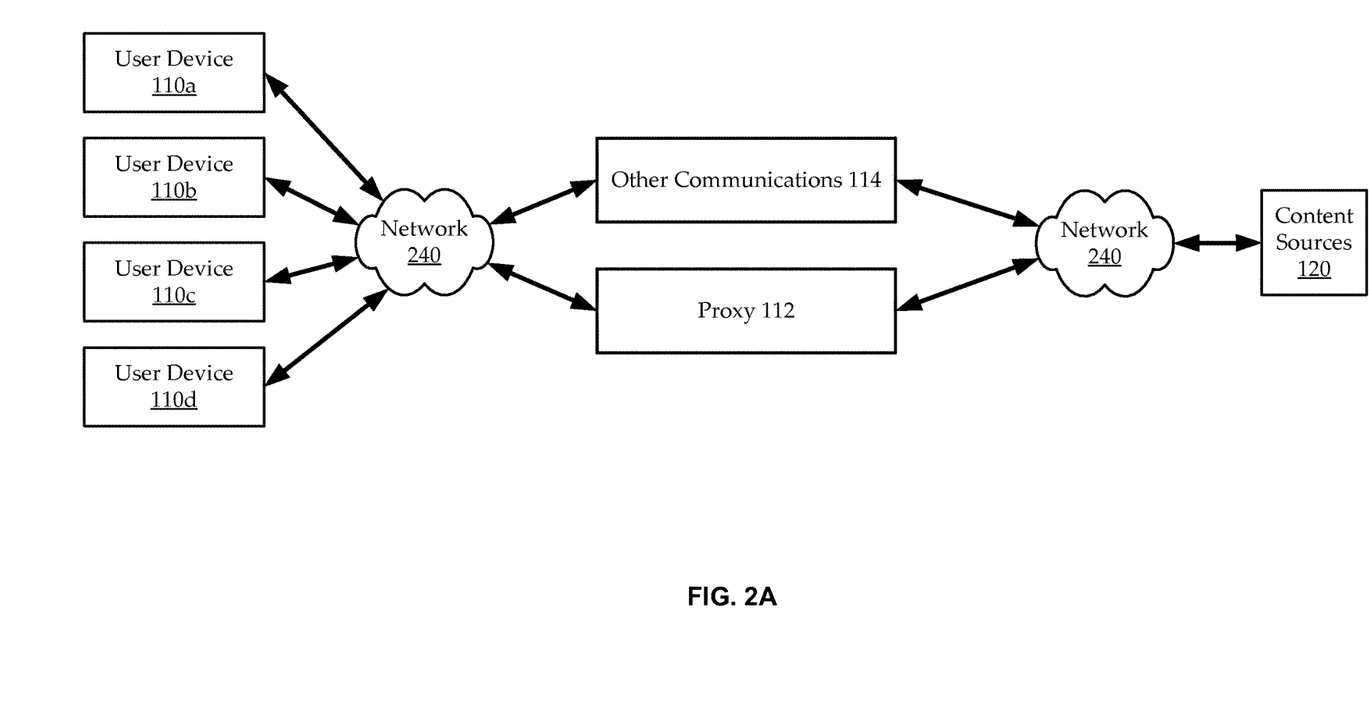
FIG. 2A illustrates a block diagram of one implementation of a communications system for differential handling of HTTPS acceleration in accordance with one embodiment.

FIG. 2A describes one potential embodiment of a system for implementing differential handling of HTTPS. FIG. 2A includes a plurality of user devices 110a-d, a network 240, proxy 112, non-HTTPS communication path 114, and content sources 120. User devices 110 may be any number of different computing devices, including smart phones, tablet computers, televisions, smart appliances, laptop or desktop computers, dedicated gaming consoles, or any other such networked device. Such devices may be part of a single household behind a single NAT device, may be part of multiple locations behind multiple NAT devices, may be individually connected directly to network 240 in any method, or may include combinations of any of the above structures. Network 240 may include the Internet, as well as various local area networks, wide area networks, wireless networks, or any such communication path between a device and a content source. In certain embodiments, network 240 may include NAT devices described above, or may include server systems, user terminals, base stations, gateways, satellite systems, or other such connection components. Non-limiting examples of systems including such components may be seen in FIGS. 2-4.

Each user device 110 may include functionality for communicating via the network 240 to content sources 120. This may be in the form of a web browser, or any other such structure for enabling network communications. Such communication functionality will include standard communication protocols for enabling communication via network 240. Embodiments of differential handling of HTTPS, however, modify such standard communication protocols in at least some of the user devices 110 to identify a proxy 112. As part of such a modification, at least a first user device of user devices 110 is modified such that HTTPS communications from the first user device will be routed to proxy 112. Other communications for the first user device will be sent along non-HTTPS communication path 114. This may be the standard communication path, or may be a customized path that complements the use of proxy 112 for acceleration of network communications.

In various embodiments, proxy 112 may be a stand-alone server computer in network 240. In alternative embodiments, proxy 112 may be a portion of a server computer, proxy server, a user terminal, such that one or more particular sockets on the computer are specifically dedicated to HTTPS acceleration. Regardless of whether proxy 112 is a stand-alone device or integrated with other functionality, proxy 112 accepts HTTPS communication from modified user devices 110 such as the first user device, and then functions as a "man-in-the-middle" (MITM) to identify prefetchable objects from the HTTPS communication. This enables the proxy 112 to request the prefetchable objects from content sources 120 before the user objects request the prefetchable object, significantly reducing communication round trip times for the user device.

Figure 2B:
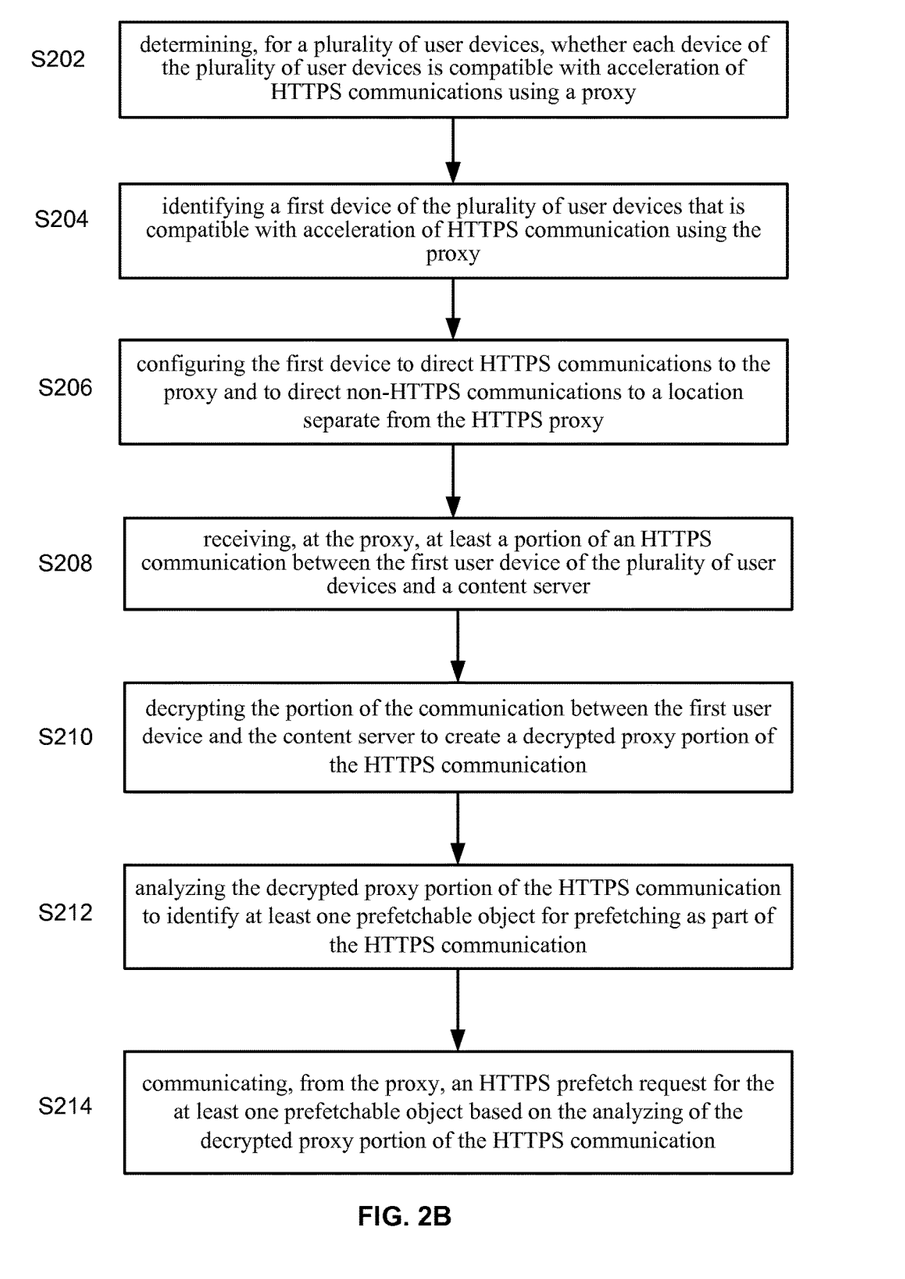
FIG. 2B illustrates a method for differential handling of HTTPS acceleration in accordance with one embodiment.

FIG. 2B describes one potential method for enabling an proxy 112. S202 involves determining, for a plurality of user devices such as user devices 110a-d, whether each device of the plurality of user devices is compatible with acceleration of HTTPS communications using an proxy such as proxy 112. One particular embodiment of this may be identifying user devices which are available for or which have previously used installed software to modify communication configurations on the target user device. This enables direct configuration of the communications functions on the user device to direct HTTPS communications to proxy 112. In certain embodiments, this may be implemented by manual configuration of a PAC file. In an alternative embodiment, this may involve determining whether each device includes WPAD support. This WPAD support may enable the use of DNS and DHCP to automatically configure the browser.

Certain embodiments using installer software may include the option to install the UT CA at the same time as the browser configuration is modified to send HTTPS traffic to the proxy 112. In other embodiments, the proxy configuration may be hard-coded on the user device, so managing the enabling/disabling of the proxy may be difficult, especially if the user device is mobile and will also be used on other networks that do not require the proxy for HTTPS. In other embodiments, the WPAD approach could potentially be used to optimize HTTPS for all browsers that support WPAD, and all other HTTP user agents would not be affected. In other words, optimization using the proxy 112 for certain devices may only be enabled for browser software. Such software may be particularly sensitive to round trip times since a user may be making a selection and waiting for a result. Non-browser communications, or other particular communications methods, may not have the HTTPS acceleration enabled due to implementation overhead and the lack of a need to reduce the round trip time of communications for those particular communication systems.

Users may need to be able to opt-in/opt-out of HTTPS acceleration. Also, there may be devices in the home for which the UT CA cannot be installed in the browser's certificate database even if the user has opted in. It may also be difficult to distinguish between HTTPS connections originating from supported and unsupported devices when there is a NAT firewall between the UT and the user devices. If the UT terminates an SSL connection from an unsupported device, it may not recover such that the application using the connection will not function properly.

In order for an proxy to distinguish between different devices behind a NAT firewall, the system for directing HTTPS communications to the proxy may have every device behind the NAT firewall communicate with a different IP of the proxy. The proxy may create a map which associates HTTPS communications with the particular device, and which enables specific devices behind the NAT firewall to use HTTPS acceleration and others not to use HTTPS acceleration due to privacy or compatibility issues. One embodiment of such a mapping is shown below in Table 1 with internal IP addresses behind a NAT firewall mapped to proxy addresses.

In addition to determining whether the communications configurations for a device are compatible with use of the proxy 112, certain embodiments may require additional checks. For example, certain embodiments may require an opt-in communication. Because of the secure nature of HTTPS, and the need to act as a MITM with access to the secure information, an opt-in may be necessary. Further still, a check for the CA created by the proxy to insure that it will be accepted by the user device may be necessary. If the CA is not accepted, the user device may present errors, pop-up windows, or other undesirable results that defeat the purpose of HTTPS acceleration. Table 1 below shows one potential example for a system including a plurality of user devices:

TABLE 1

| User Device | Internal user device IP | WPAD support? | Public IP for proxy | Certificate accepted | Opt-in | Result |
| --- | --- | --- | --- | --- | --- | --- |
| Internet TV | 192.168.1.11 | No | None | No | No | Normal, non-proxied |

TABLE 1-continued

| User Device | Internal user device IP | WPAD support? | Public IP for proxy | Certificate accepted | Opt-in | Result |
|---|---|---|---|---|---|---|
| Tablet device | 192.168.1.12 | Yes | 209.77.77.12 | No | No | HTTPS sent Traffic sent to proxy, but not decrypted. |
| Laptop running Safari ™ | 192.168.1.13 | Yes | 209.77.77.13 | Yes | No | Traffic sent to proxy but not decrypted. |
| PC 1 running Chrome ™ | 192.168.1.14 | Yes | 209.77.77.14 | Yes | Yes | Full optimization. |
| PC 2 running Chrome ™ | 192.168.1.15 | Yes | 209.77.77.15 | Yes | Yes | Full optimization. |

In specific embodiments, particular application programming interface functions may be used to help distinguish devices behind a firewall by allowing different user devices to send proxied traffic to different destination addresses. For example in the table above, traffic originating from 192.168.1.14 may be sent to a different IP address of a proxy than traffic from 192.168.1.15. The proxy may then distinguish the devices based on which address of the proxy receives the network communications traffic. An example of logic for such functionality may be written as:

(1) FindproxyForURL(url, host) {var=proxyip="dnsResolve("proxy.serviceprovider.com+ myIpAddress( ); return "proxy"+"proxyip"+":8080; DIRECT";}

Such a function may result in a domain name server request for a host name of "proxy.serviceprovider.com_192.168.1.12" when the local address for a user device is 192.168.1.12. A mapping between that address or device name and a given destination proxy address may be used to respond to the DNS host request with the particular mapped IP address. The user device or certain communication functionality such as a browser on the user device may then send traffic to the specified proxy IP address. Devices in a local network that do not include support for such functions or which have opted out of such functions may simply communicate together on a standard channel which is not unique for devices behind the NAT device in the local network. In other words, some non-compatible user devices may not be provided a unique service provider IP address. These devices may simply use whatever service provider IP address would have been set in the absence of the customization provided by the embodiment described herein. Alternatively, a set channel may be used for all non-compatible devices that are not given unique service IP addresses.

In certain embodiments, private IPs are assigned via DHCP, so the assignment can change over time for a given device. The PC running Chrome™[1] browser in the above table could have 192.168.1.14 one day and 192.168.1.13 the next day. For this reason, whenever new proxied HTTPS traffic arrives destined for one of the allocated proxy IPs (209.77.77.12, 209.77.77.13, or 209.77.77.14 in the above example) after some configurable period of non-use, the initial connections may be bypassed without full optimization until a probe can be used to determine whether or not the device can support full HTTPS optimization. This probe HTTPS object can be injected into standard HTTP HTML, for instance, by adding the Javascript®[2] re-determine compatibility and updating a mapping of devices behind the NAT firewall. Such a probe may cause an HTTPS request to be issued by the active web browser. Since we know the destination host for the request is a test probe host, the system may safely terminate an SSL for the request initiated by the probe and attempt to use a CA generated by the proxy. If the browser accepts the generated CA, then the system may assume for the current mapping that it is possible to accelerate the HTTPS communications for this device. If the browser does not accept the CA certificate, then full optimization is not implemented for this mapped device. Such a probe may happen in the background of the user device and should have a minimal impact on a user experience since the probe communication is small.

S204 then involves identifying a first user device of the plurality of user devices 110 that is compatible with acceleration of HTTPS communication using the proxy 112. This may include sending test communications to each device to identify the settings of the user device 110, and to verify that other elements of the system such as the CA and any "opt-in" are present. S206 involves configuring the first device to direct HTTPS communications to the proxy and to direct non-HTTPS communications to a location separate from the proxy. In certain embodiments, this may involve adjusting the configuration for HTTPS communications while making no-adjustments to non-HTTPS communications. Directing non-HTTPS communications to a location separate from the proxy may thus simply mean making no adjustments to a standard communication. S208 then includes receiving, at the proxy 112, at least a portion of an HTTPS communication between the first user device of the plurality of user devices 110 and a content server. For example, in Table 1, three of the four devices are considered compatible with acceleration of HTTPS communication and configured to send HTTPS communications to the proxy 112: the laptop, the tablet, and the PC. The non-compatible device, shown as the television, will send communications via whatever path is standard in the device. This may be non-HTTPS communication path 114, or some other path. The rest of the devices shown in Table 1 send HTTPS communications to the proxy 112.

S210 includes decrypting the portion of the HTTPS communication between the first user device and the content source 120 to create a decrypted proxy portion of the HTTPS communication. In some embodiments, this may involve terminating a SSL that is part of the HTTPS communication at the proxy 112. In other embodiments, different communication intercept implementations may be used. While certain devices may be configured to communicate HTTPS communications to the proxy 112, not all of these HTTPS communications will be accelerated by the proxy. The requirements for acceleration may vary from system to system. In the example shown in Table 1, on one device, the "PC running Chrome browser" is shown as actually implementing full acceleration. For the embodiment in Table 1, the decryption will not occur for the tablet because the tablet will not accept the CA created by the proxy 112, and the laptop HTTPS communications will not be decrypted because no "opt-in" is identified to provide permission for the proxy 112 to override the security of the HTTPS communications. Various embodiments may include periodic checks or user-initiated checks to verify that the CA functionality and "opt-in" selections have not changed.

S212 includes analyzing the decrypted proxy portion of the HTTPS communication to identify at least one prefetchable object for prefetching as part of the HTTPS communication. This is part of the acceleration process which is performed for devices which meet all of the elements for HTTPS acceleration. This may include scanning the communication for references to objects that will be requested or are expected to be requested by the user device in response to the user device receiving the portion of the HTTPS communication with the reference. Such references may be container files, Javascript®$^2$ elements that create uniform resource locators (URLs), tracking references identified by a communication history stored at the proxy 112, or by another such method of identifying prefetchable references.

S214 then includes communicating, from the proxy 112, an HTTPS prefetch request for the at least one prefetchable object based on the analyzing of the decrypted proxy portion of the HTTPS communication. This may include communicating a CA that is generated by the proxy 112, or may be any other such method of communicating by the proxy acting as a MITM. The server certificates presented to the web browser client may be dynamically generated by and signed with a CA in the UT and may contain most of the same fields as the original webserver certificate. The subject DN, serial number, validity dates, and extensions may be preserved. However, the issuer DN may now be set to the name of the UT's certificate issuing authority (CA) and the public/private keys of the UT CA may be used in creating a forged certificate. If the browser trusts this CA, due to the UT CA having been installed in the browser's certificate database, then the MITM session, which involves splitting the browser-to-content-server session into two SSL sessions split at the UT, may occur in a way that is transparent to the end user. In other embodiments, this may mean that the acceleration is transparent except for an opt-in indication and an address redirection implemented on the device.

In certain embodiments, the initial structure of determining which HTTPS traffic to optimize may be obscured when translation is done with a NAT firewall between the user device and the proxy 112. For example, if the proxy 112 terminates an SSL connection from an unsupported device, the proxy may not be able to recover the communication and may cause the connection not to function properly.

Figure 3:
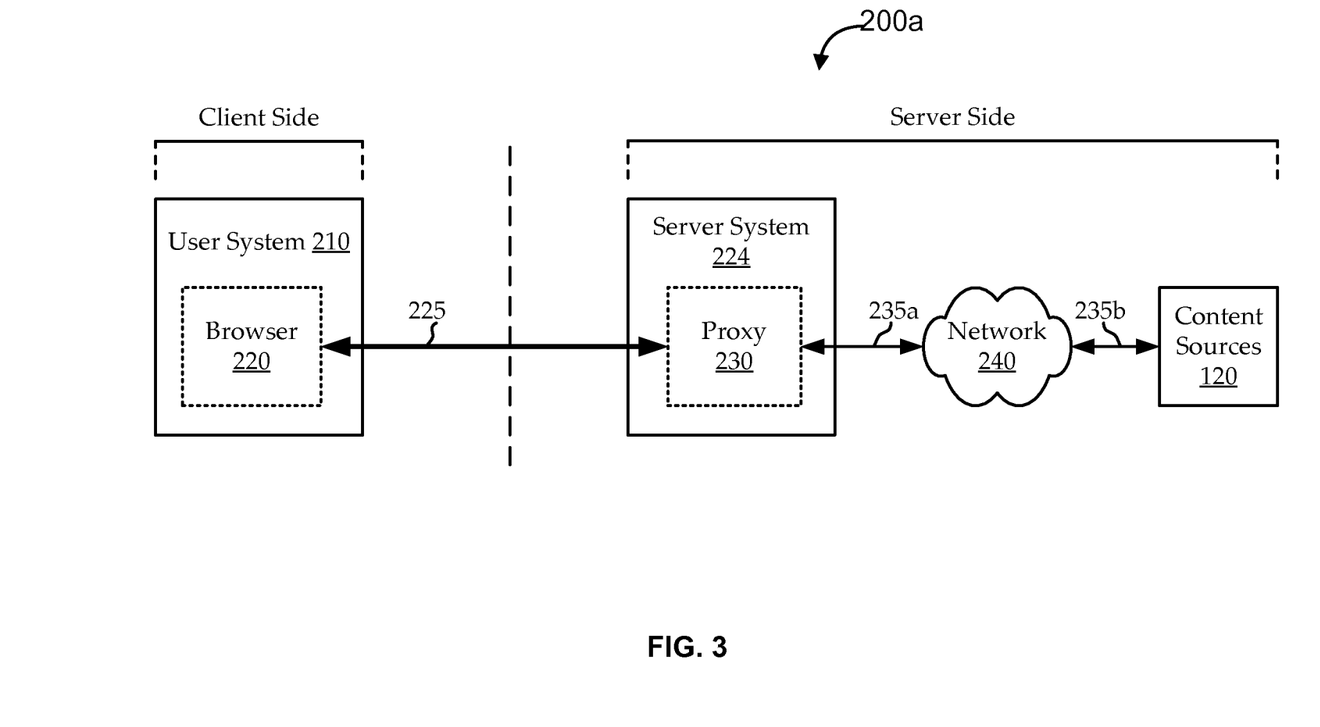
FIG. 3 illustrates one implementation of a communications system in accordance with one embodiment.

FIG. 3 then describes an additional embodiment of a system which may implement HTTPS acceleration. The communications system 200a facilitates communications between a user system 210 and content sources 120 via a browser 220, a proxy 230, and a network 240. The browser 220 may be implemented as part of one of the user devices 110 of FIG. 2A, and the proxy 230 may be equivalent to proxy 112 of FIG. 2A. The browser 220 and the proxy 230 are configured to effectively provide HTTPS acceleration between the user system 210 and the content source 120.

Embodiments of the system including proxy 230 and the browser 220 can be implemented in a number of ways without departing from the scope of the invention. In some embodiments, the proxy 230 is a proxy server and the browser 220 is an executable operating system on a user device. For example, a transparent intercept proxy can be used to intercept traffic in a way that is substantially transparent to users at the client side of the proxy tunnel.

Embodiments of the user system 210 may include any component or components for providing a user with network interactivity. For example, the user system 210 may include any type of computational device, network interface device, communications device, or other device for communicating data to and from the user. Typically, the communications system 200a facilitates communications between multiple user systems 210 and a variety of content sources 120 over one or more networks 240 (only one of each is shown in FIG. 2B for the sake of clarity). The content sources 120 are in communication with the proxy 230 via one or more networks 240. The network 240 may be any type of network and can include, for example, the Internet, an Internet protocol ("IP") network, an intranet, a wide-area network ("WAN"), a local-area network ("LAN"), a virtual private network ("VPN"), the Public Switched Telephone Network ("PSTN"), and/or any other type of network supporting data communication between devices described herein, in different embodiments. The network 240 may also include both wired and wireless connections, including optical links.

As used herein, "content source" is intended broadly to include any source of content in which the users may be interested. For example, a content source 120 may provide website content, television content, file sharing, multimedia serving, voice-over-Internet-protocol (VoIP) handling, and/or any other useful content. It is worth noting that, in some embodiments, the content sources 120 are in direct communication with the proxy 230 (e.g., not through the network 240). For example, the proxy 230 may be located in a gateway that includes a content or application server. As such, discussions of embodiments herein with respect to communications with content sources 120 over the network 240 are intended only to be illustrative, and should not be construed as limiting.

In some embodiments, when the user system 210 communicates with the content source 120, the proxy 230 intercepts the communications for one or more purposes.

As described below, the proxy 230 may be part of a server system 224 that includes components for server-side communications (e.g., base stations, gateways, satellite modem termination systems (SMTSs), digital subscriber line access multiplexers (DSLAMs), etc.). The proxy 230 may act as a transparent and/or intercepting proxy. For example, the browser 220 is in communication with the proxy 230 over a client-server communication link, and the proxy 230 is in communication with the content source 120 over a content network link. The proxy 230 may act as a transparent MITM to intercept the data as it passes between the client-server communication link and the content network link. Some purposes of the interception may include filtering, caching, parsing, and/or otherwise processing the requests and responses in addition to prefetching for HTTPS acceleration. For example, when the user system 210 requests a web object from a content source 120, the proxy 230 may intercept and parse the request to implement prefetching as well as other types of functionality.

It is worth noting that embodiments of the client-server communication link 225 (e.g., between the browser 220 and the proxy 230) and the content network link 235 including content network link portions 235a and 235b (e.g., between the proxy 230 and the content sources 120 via the networks 240) can be implemented as various types of links have different and/or changing link characteristics, including, for example, differences in bandwidth, latency, cost per bit, etc. For example, while certain embodiments are described in the context of a satellite communications system, where the client-server communication link 225 includes at least one satellite link, other topologies and link types are possible. While the communications system 200a illustrated in FIG. 3 shows only one communication link, embodiments may operate in the context of, and take advantage of, links from a variety of different user devices as shown in FIGS. 1 and 4.

Figure 4:
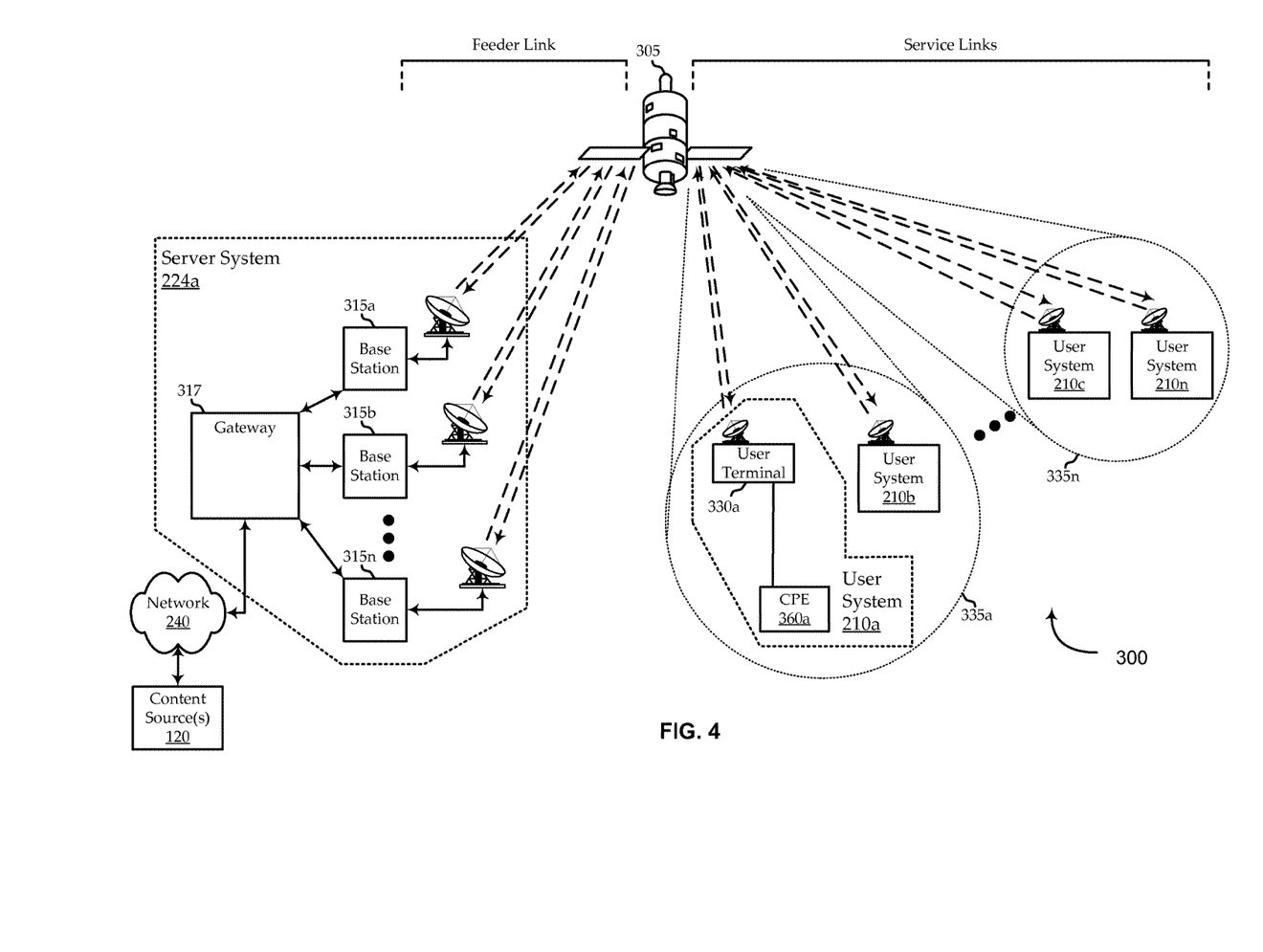
FIG. 4 illustrates one implementation of a communications system in accordance with one embodiment.

FIG. 4 shows one additional example of an embodiment in which HTTPS acceleration may be implemented. For implementation of HTTPS acceleration in accordance with the embodiments described above, but implemented in a system such as is described in FIG. 4, a user system 210 may include user terminal 330a and consumer premises equipment (CPE) 360a. Each CPE 360 may be equivalent to a user device such as individual user device 110a of FIG. 2A. In certain embodiments, a user system such as user system 210a may include a DNS device between a user terminal and multiple CPE devices 360. In various embodiments, a proxy may be implemented in any hardware location along the communication path from a CPE 360a to a content server. Due to latency issues associated with satellite communication systems, a proxy located in a user terminal 330 may provide prefetching functionality. In alternative embodiments, the proxy may be distributed, such that a portion of the proxy located at a gateway 317 or at one of base stations 315a,b,n may prefetch an object identified in an HTTPS communication and send the prefetched object to a portion of the proxy on the user terminal 330a. This may enable the fastest response time when a CPE 360a requests the object, as the user terminal 330a will be able to respond without latency over the satellite link.

FIG. 4 shows a block diagram of an embodiment of a satellite communications system 300 having a server system 224a in communication with multiple user systems 210a,b,c,n via a satellite 305 over multiple spot beams 335a,n, according to various embodiments. The server system 224a may include any server components, including base stations 315a,b,n, gateway 317, etc. A base station 315 is sometimes referred to as a hub or ground station. In certain embodiments, the base station 315 has functionality that is the same or different from a gateway 317. For example, as illustrated, gateway 317 provides an interface between the network 240 and the satellite 305 via a number of base stations 315. Various embodiments provide different types of interfaces between the gateway 317 and base stations 315. For example, the gateway 317 and base stations 315 may be in communication over leased high-bandwidth lines (e.g., raw Ethernet), a virtual private large-area network service (VPLS), an Internet protocol virtual private network (IP VPN), or any other public or private, wired or wireless network. Embodiments of the server system 224a are in communication with one or more content source(s) 120 via one or more networks 240.

As traffic traverses the satellite communications system 300 in multiple directions, the gateway 317 may be configured to implement multi-directional communications functionality. For example, the gateway 317 may send data to and receive data from the base stations 315. Similarly, the gateway 317 may be configured to receive data and information directed to one or more user systems 210, and format the data and information for delivery to the respective destination device via the satellite 305; or receive signals from the satellite 305 (e.g., from one or more user systems 210) directed to a destination in the network 240, and process the received signals for transmission through the network 240.

In various embodiments, one or more of the satellite links are capable of communicating using one or more communication schemes. In various embodiments, the communication schemes may be the same or different for different links. The communication schemes may include different types of coding and modulation combinations. For example, various satellite links may communicate using physical layer transmission modulation and coding techniques using adaptive coding and modulation schemes, etc. The communication schemes may also use one or more different types of multiplexing schemes, including Multi-Frequency Time-Division Multiple Access ("MF-TDMA"), Time-Division Multiple Access ("TDMA"), Frequency Division Multiple Access ("FDMA"), Orthogonal Frequency Division Multiple Access ("OFDMA"), Code Division Multiple Access ("CDMA"), or any number of other schemes.

Figure 5:
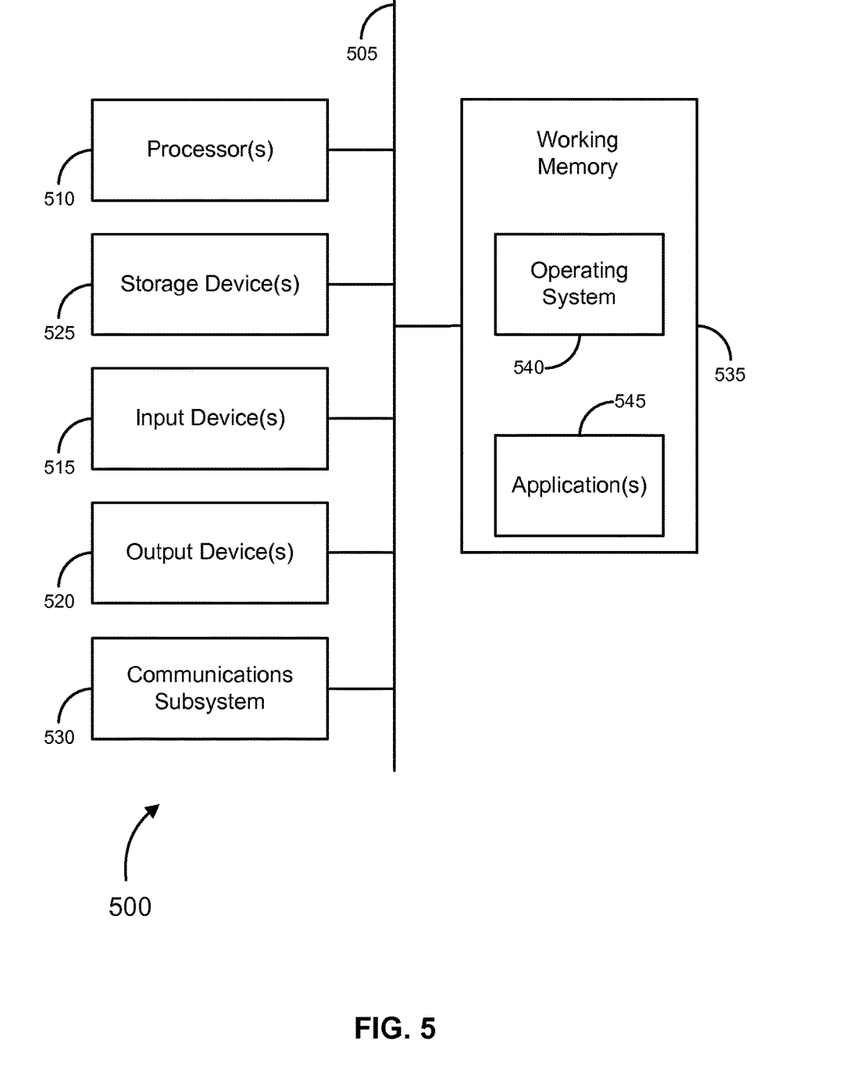
FIG. 5 illustrates a block diagram of one potential implementation of a computing device in accordance with one potential embodiment of the innovations presented herein.

FIG. 5 provides a schematic illustration of one embodiment of a computer system 500 that can perform the methods of the invention, as described herein, and/or can function, for example, as any part of user device 110 or proxy 112 of FIG. 2A. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include, without limitation, a mouse, a keyboard and/or the like; and one or more output devices 520, which can include, without limitation, a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 500 might also include a communications subsystem 530, which can include, without limitation, a modem, a network card (wireless or wired), an infrared communication device, a wireless communication device and/or chipset (such as a Bluetooth®[3] device, an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540 and/or other code, such as one or more application programs 545, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 500) to perform methods of the invention. According to a set of embodiments, some or all of the procedures of such methods are performed by the computer system 500 in response to processor 510 executing one or more sequences of one or more instructions (which might be incorporated into the operating system 540 and/or other code, such as an application 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer-readable medium", as used herein, refer to any medium that participates in providing data that causes a machine to operate in a specific fashion. In an embodiment implemented using the computer system 500, various machine-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation, dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc., carried by the signals) to the working memory 535, from which the processor(s) 510 retrieves and executes the instructions. The instructions received by the working memory 535 may optionally be stored on a storage device 525 either before or after execution by the processor(s) 510.

Figure 6:
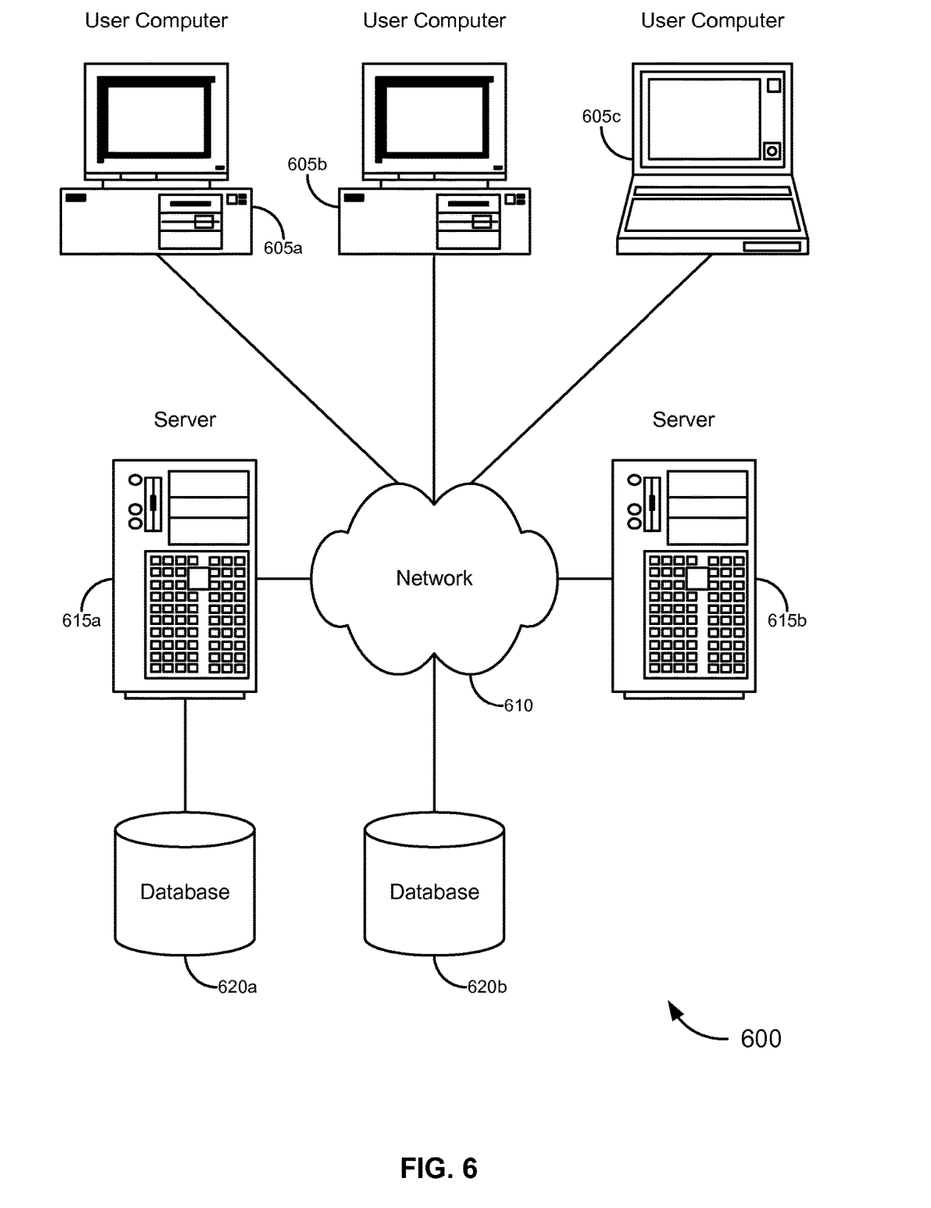
FIG. 6 illustrates a block diagram of one potential implementation of a communications system in accordance with one potential embodiment of the innovations presented herein.

Merely by way of example, FIG. 6 illustrates a schematic diagram of a network system 600 that can be used in accordance with one set of embodiments. In various embodiments, the network system 600 may function as all or part of network 240 of FIG. 2A, with hardware components functioning as user devices 110 or proxy 112. The system 600 can include one or more user computers 605a-c. The user computers 605 can be general purpose personal computers (including, merely by way of example, personal computers and/or laptop computers running any appropriate flavor of Microsoft® Windows®[4] and/or Mac OS®[5] operating systems) and/or workstation computers running any of a variety of commercially-available UNIX®[6] or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant (PDA), capable of communicating via a network (e.g., the network 610 described below) and/or displaying and navigating web pages or other types of electronic documents. Although the exemplary system 600 is shown with three user computers 605a-c, any number of user computers can be supported.

Certain embodiments of the invention operate in a networked environment, which can include a network 610. The network 610 can be any type of network familiar to those skilled in the art that can support data communications using any of a variety of commercially-available protocols, including, without limitation, TCP/IP, SNA, IPX, AppleTalk®[5], and the like. Merely by way of example, the network 610 can be a local area network ("LAN"), including without limitation an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 802.11 suite of protocols, the Bluetooth protocol known in the art, and/or any other wireless protocol; and/or any combination of these and/or other networks.

Embodiments of the invention can include one or more servers 615a,b. Each of the servers 615 may be configured with an operating system, including, without limitation, any of those discussed above as well as any commercially (or freely) available server operating systems. Each of the servers 615 may also be running one or more applications, which can be configured to provide services to one or more user computers 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java®[2] servers, and the like. In some embodiments of the invention, the web server may be configured to serve web pages that can be operated within a web browser on one or more of the user computers 605 to perform methods of the invention.

The servers 615, in some embodiments, might include one or more application servers, which can include one or more applications accessible by a client running on one or more of the user computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods of the invention). Merely by way of example, a web application can be implemented as one or more scripts or programs written in any suitable programming language, such as Java, C, C# or C++, and/or any scripting language, such as Perl, Python, or TCL, as well as combinations of any programming/scripting languages. The application server(s) can also include database servers, including, without limitation, those commercially available from Oracle, Microsoft, Sybase, IBM and the like, which can process requests from clients (including, depending on the configurator, database clients, API clients, web browsers, etc.) running on a user computer 605 and/or another server 615. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a,b. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605 and servers 615, so long as the database 620 can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605 and servers 615 can be stored locally on the respective computer or server and/or remotely, as appropriate.) In one set of embodiments, the database 620 can be a relational database, such as an Oracle®[2] database, that is adapted to store, update, and retrieve data in response to SQL-formatted commands. The database might be controlled and/or maintained by a database server, as described above, for example.

While various embodiments are described above, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with, or without, certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with, or without, certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

APPENDIX TO THE SPECIFICATION

[1] "Chrome" is a trademark of Google, Inc.
[2] "Javascript", "Java" and "Oracle" are registered trademarks of Oracle and/or its affiliates. Other names may be trademarks of their respective owners.
[3] The "Bluetooth" word mark and logos are registered trademarks owned by Bluetooth SIG, Inc. Other trademarks and trade names are those of their respective owners.
[4] "Microsoft" and "Windows" are either registered trademarks or trademarks of Microsoft Corporation in the United States and/or other countries.
[5] "Mac OS" and "AppleTalk" are registered trademarks of Apple, Inc., registered in the U.S. and other countries.
[6] "UNIX" is a registered trademark of The Open Group.

What is claimed is:

1. A method comprising:
    intercepting, by a proxy server, a resolution request that has been issued by a first user device operating in a local area network behind a network address translation (NAT) device, wherein the resolution request comprises a name that identifies the first user device within the local area network, and wherein the proxy server is external to the local area network and the NAT device;
    selecting a unique service IP address for the first user device based on the name that identifies the first user device within the local area network;
    creating an association between the name that identifies the first user device within the local area network and the unique service IP address;
    issuing, by the proxy server, a name resolution response containing the unique service IP address to the first user device;
    receiving, by the proxy server, network communications traffic from the first user device, the network communications traffic destined for the unique service IP address; and
    identifying the first user device from the network communications traffic received by the proxy server based on the association between the unique service IP address and the name that identifies the first user device within the local area network.

2. The method of claim 1 wherein the name that identifies the first user device within the local area network is constructed by concatenating a local IP address of the first user device to a global domain name string that identifies a service on a network.

3. The method of claim 1 wherein the network communications traffic comprises a request for a web page object from a content server, and further comprising providing the web page object to the first user device based on the name that identifies the first user device within the local area network and the request for the web page object.

4. The method of claim 1 further comprising:
    configuring the first user device to support name based resolution requests using an installer prior to issuing the resolution request comprising the name that identifies the first user device within the local area network.

5. The method of claim 1 further comprising:
    configuring the first user device to support local name based resolution requests using configuration structures installed on the first user device prior to the first user device issuing the resolution request comprising the name that identifies the first user device within the local area network.

6. The method of claim 5 further comprising:
    remotely configuring the first user device to support local name based resolution requests using a proxy auto-configuration (PAC) file prior to issuing the resolution request comprising the name that identifies the first user device within the local area network.

7. The method of claim 1 further comprising:
    determining, for a plurality of user devices comprising the first user device, whether each device of the plurality of user devices is compatible with acceleration of HTTPS communications using a proxy; and
    identifying that the first user device is compatible with acceleration of HTTPS communication using the proxy.

8. The method of claim 7 further comprising:
    receiving, at the proxy, at least a portion of an HTTPS communication between the first user device of the plurality of user devices and a content server;
    decrypting the portion of the HTTPS communication between the first user device and the content server to create a decrypted proxy portion of the HTTPS communication;

analyzing the decrypted proxy portion of the HTTPS communication to identify at least one prefetchable object for prefetching as part of the HTTPS communication; and communicating, from the proxy, an HTTPS prefetch request for the at least one prefetchable object based on the analyzing of the decrypted proxy portion of the HTTPS communication.

9. The method of claim 8 further comprising:

storing a copy of the at least one prefetchable object accessible by the proxy server;

receiving at the proxy server, from the first user device, a request for the at least one prefetchable object; and communicating the copy of the at least one prefetchable object via HTTPS from the proxy to the first user device, in response to receipt of the request for the at least one prefetchable object.

10. The method of claim 9 wherein using the unique service IP address as a destination IP for traffic from the first user device comprises:

communicating HTTPS messages from the first user device to the unique service IP address; and communicating non-HTTPS messages to a standard service IP address that is different than the unique service IP address.

11. The method of claim 7 further comprising:

determining whether an acceptable certificate is available for each device of the plurality of user devices.

12. The method of claim 11 further comprising:

wherein determining, for the plurality of user devices, whether each device of the plurality of user devices is compatible with acceleration of HTTPS communications using the proxy further comprises:

checking an opt-in selection for each device of the plurality of user devices; and identifying a first opt-in selection associated with the first user device.

13. The method of claim 7 further comprising:

determining that a second user device of the plurality of user devices includes WPAD support but is not compatible with HTTPS proxy acceleration;

receiving, at the proxy, at least a portion of a second HTTPS communication involving the second user device; and relaying the portion of the second HTTPS communication involving the second user device without decrypting the portion of the second HTTPS communication at the proxy.

14. The method of claim 13 wherein determining that the second user device of the plurality of user devices includes WPAD support but is not compatible with proxy acceleration comprises:

failing to identify an opt-in selection for the second user device.

15. The method of claim 1 further comprising:

intercepting, by the proxy server, a second resolution request from a second user device operating on the local area network behind the NAT device, wherein the second resolution request comprising a second name that identifies the second user device within the local area network, and wherein the second resolution request is intercepted at the proxy server after being communicated from the second user device to the NAT device;

creating, at the proxy server, a second association between the second name that identifies the second user device within the local area network and a second unique service IP address;

issuing, by the proxy server, a second name resolution response containing the second unique service IP address to the second user device;

receiving, by the proxy server, second network communications traffic sent from the second user device using the second unique service IP address; and identifying the second user device from the second network communication traffic received by the proxy server based on the second association between the second unique service IP address and the second name that identifies the second user device within the local area network.

16. The method of claim 15 further comprising:

intercepting, by the proxy server, a third resolution request from a third user device operating on a second local area network behind a second NAT device, wherein the third resolution request comprises a third name that identifies the third user device within the second local area network, and wherein the third resolution request is intercepted at the proxy server after being communicated from the third user device to the second NAT device;

creating, at the proxy server, a third association between the third name that identifies the third user device within the second local area network and a third unique service IP address;

issuing, by the proxy server, a third name resolution response containing the third unique service IP address to the third user device;

receiving, by the proxy server, third network communications traffic sent from the third user device using the third unique service IP address; and identifying the third user device from the third network communication traffic received by the proxy server based on the third association between the third unique service IP address and the third name that identifies third user device within the second local area network.

17. The method of claim 16 wherein the proxy server comprises:

a first table comprising associations for the local area network including the association and the second associating; and a second table comprising associations for the second local area network including the third association.

18. A non-transitory computer readable medium comprising computer readable instructions that, when executed by at least one processor, cause the at least one processor to:

intercept a resolution request from a first user device in a local area network behind a network address translation (NAT) device, the resolution request comprising a name that identifies the first user device within the local area network, and the intercept configured to occur outside the local area network and on an external side of the NAT device;

select a unique service IP address for the first user device based on the name;

create an association between the name that identifies the first user device within the local area network and the unique service IP address;

issue a name resolution response containing the unique service IP address to the first user device;

receive network communications traffic sent from the first user device, the network communications traffic destined for the unique service IP address; and identify the first user device from the network communications traffic received by a proxy server based on the association between the unique service IP address and the name that identifies the first user device within the local area network.

19. The non-transitory computer readable medium of claim 18 wherein the instructions further cause the at least one processor to:

communicate configuration instructions from the proxy server comprising the processor to the first user device; wherein the configuration instructions comprise web proxy autodiscovery protocol (WPAD) supported instructions for configuring a proxy auto-config (PAC) file of the first user device to issue a resolution request including the name that identifies the first user device within the local area network to the proxy server.

20. A proxy server comprising:

means for intercepting a resolution request that has been issued by a first user device operating in a local area network behind a network address translation (NAT) device, wherein the resolution request comprises a name that identifies the first user device within the local area network, and wherein the proxy server is external to the local area network and the NAT device;

means for selecting a unique service IP address for the first user device based on the name;

means for creating an association between the name that identifies the first user device within the local area network and the unique service IP address, the unique service IP address associated with the proxy server;

means for receiving network communication traffic from the first user device, the network communications traffic destined for the unique service IP address;

means for identifying the first user device from the network communications traffic received by the proxy server based on the association between the unique service IP address and the name that identifies the first user device within the local area network.

\* \* \* \* \*